United States Patent
Agarwala et al.

(10) Patent No.: US 7,499,586 B2
(45) Date of Patent: Mar. 3, 2009

(54) PHOTOGRAPHING BIG THINGS

(75) Inventors: Aseem O. Agarwala, Seattle, WA (US); Maneesh Agrawala, Seattle, WA (US); Michael F. Cohen, Seattle, WA (US); David H. Salesin, Seattle, WA (US); Richard Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 11/323,241

(22) Filed: Dec. 30, 2005

(65) Prior Publication Data

US 2007/0076016 A1 Apr. 5, 2007

Related U.S. Application Data

(60) Provisional application No. 60/723,576, filed on Oct. 4, 2005.

(51) Int. Cl.
*G06K 9/00* (2006.01)
*G06K 9/36* (2006.01)
*G09G 5/00* (2006.01)

(52) U.S. Cl. .................. 382/154; 382/284; 345/629

(58) Field of Classification Search ................ 382/154, 382/284; 345/419, 424, 629, 634; 348/42, 348/46, 47, 48, 50, 51, 584, 588; 356/12, 356/22
See application file for complete search history.

(56) References Cited

U.S. PATENT DOCUMENTS

| 4,111,696 | A | | 9/1978 | Sirlin |
|---|---|---|---|---|
| 4,835,532 | A | | 5/1989 | Fant |
| 5,187,754 | A | | 2/1993 | Currin |
| 5,259,037 | A | * | 11/1993 | Plunk .......................... 382/154 |
| 5,657,402 | A | | 8/1997 | Bender |
| 5,745,126 | A | * | 4/1998 | Jain et al. .................. 382/154 |
| 5,963,664 | A | | 10/1999 | Kumar |
| 6,097,394 | A | | 8/2000 | Levoy |
| 6,281,904 | B1 | | 8/2001 | Reinhardt |
| 6,393,163 | B1 | | 5/2002 | Burt |
| 6,532,036 | B1 | | 3/2003 | Peleg |

(Continued)

FOREIGN PATENT DOCUMENTS

| EP | 0473310 A2 | 3/1992 |
|---|---|---|
| JP | 63-079478 A | 4/1988 |
| WO | 200079785 A1 | 12/2000 |

OTHER PUBLICATIONS

International Search Report dated Mar. 12, 2007 for PCT Application Serial No. PCT/US2006/038876, 3 Pages.

(Continued)

*Primary Examiner*—Daniel G Mariam
(74) *Attorney, Agent, or Firm*—Amin, Turocy & Calvin LLP

(57) ABSTRACT

The subject application provides an architecture that facilitates producing a single image that can visualize a scene too large to depict from any single perspective view. These images can be stitched together on a 2-dimensional picture surface to form a multi-perspective image of the entire extent of the scene depicted by the input images. Where the respective images overlap, an objective function can be employed to determine where to make a transition between one image and the next. The objective function can employ a data cost and a seam cost to make this determination.

20 Claims, 10 Drawing Sheets

U.S. PATENT DOCUMENTS

| | | | |
|---|---|---|---|
| 6,639,596 | B1 | 10/2003 | Shum |
| 6,750,860 | B1 | 6/2004 | Shum |
| 6,819,318 | B1 * | 11/2004 | Geng ................ 345/420 |
| 6,954,217 | B1 | 10/2005 | Nakayama |
| 7,466,336 | B2 * | 12/2008 | Regan et al. ............ 348/50 |
| 2005/0222836 | A1 | 10/2005 | Sickels |

OTHER PUBLICATIONS

J. Yu, et al. A Framework for Multiperspective Rendering. Computer Graphics Forum, May, 2004. vol. xx (200y), No. z, pp. 1-8.

Scott Vallance, et al. Multi-Perspective Images for Visualisation. 2002. Australian Computer Society, Inc. Conferences in Research and Practice in Information Technology, vol. II.

Eugene Borovikov, et al. An Efficient System for Multi-perspective Imaging and Volumetric Shape Analysis. Found online—http://pages.cpsc.ucalgary.ca/~mario/npr/bib/2000s/2004/cnf/Yu-EGSR-04.pdf—last accessed Oct. 28, 2005.

Augusto Roman, et al. Interactive Design of Multi-Perspective Images for Visualzing Urban Landscapes. IEEE Visualization 2004. Austin, Texas.

* cited by examiner

PHOTOGRAPHING BIG THINGS

CROSS-REFERENCE TO RELATED APPLICATIONS

This application claims the benefit of U.S. Provisional Application Ser. No. 60/723,576, filed Oct. 4, 2005, entitled "PHOTOGRAPHING BIG THINGS." The entirety of this application is incorporated herein by reference.

BACKGROUND OF THE INVENTION

Depictions of large phenomonena, such as the sides of a long city street or the side of a large cruise ship, are difficult to create with a camera. A single perspective photograph of buildings taken from the opposite side of a street, for example, will capture only a short portion of a street that may extend for many blocks. A photograph with a wider field-of-view will capture a slightly longer section of the street, but the appearance of the street will appear more and more distorted towards the edges of the image. One solution to capturing a large scene is to take a photograph from much farther away. However, this isn't always possible due to intervening objects (as in the case of a city block), and will produce an image that looks quite a bit different from the appearance of the street that a human would see when walking along it. Since a local observer sees streets from a closer viewpoint, perspective foreshortening is more pronounced; awnings get smaller as they extend from the observer's location, and crossing streets converge as they extend away from the observer. Images taken from a viewpoint far away lose these useful depth cues.

Previous work has introduced the concept of a photo montage, which, in general is a process of assembling a single photograph from a series of photographs. Typically, there was an assumption that all the pictures would be taken of the same thing from the same point of view, but that something was changing, for example, if it were a group photo, different people might be smiling or not be smiling at any particular moment. Hence, one could employ this process to pick out all the smiling people to assemble a good image. The underlying technology dealt with graph cuts, which established some kind of objective function of what you want (e.g., smiling people), and the system would examine the pixels from the input images and choose the best one. However, this system cannot handle a moving camera very well. In most cases, the input images must come from still camera, or at most, rotating about its optical axis.

Multi-perspective images have long been used by artists to portray large scenes. Perhaps the earliest examples can be found in ancient Chinese scroll paintings, which tell stories through space and time with multiple perspectives. Kubovy [1986] describes the multi-perspective effects that can be found in many Renaissance paintings, and explains that the primary motivation is to avoid perspective distortion in large scenes that can look odd, especially at the edges. For example, people in these paintings are often depicted from a viewpoint directly in front of them, even if the people are far from the center of the image. Otherwise they would be stretched in unsightly ways. More recently, artist Michael Koller has created multi-perspective images of San Francisco streets. The images consist of multiple regions of linear perspective photographs artfully seamed together to hide the transitions. Each building of the city block looks roughly like what you would see if you were actually standing directly in front of the building.

As detailed above, multi-perspective images are not new; they can be found in both ancient and modern art, as well as in computer graphics and vision research. However, one difficulty of creating a multi-perspective image that visualizes a large scene is not well-defined in general. For example, if the scene were completely planar, the scene could be modeled as a rectangle with a single texture map, and the ideal output would trivially be that texture map. However, in a world of varying depths, the problem of parallax arises. Parallax refers to the fact that as an observer moves, objects closer to the observer appear to move faster than objects farther away from the observer. Thus, images taken from shifted viewpoints of a world with varying depths do not line up in their overlapping regions.

Researchers have also explored many uses of multi-perspective imaging. For example, rendering of multi-perspective images from 3D models was explored by several researchers [Agrawala et al. 2000; Yu and McMillan 2004; Glassner 2000]. Multi-perspective images were also used as a data structure to facilitate the generation of traditional perspective views [Wood et al. 1997; Rademacher and Bishop 1998], however, research using captured imagery is less prevalent. Kasser and Egels [2002] researched much about photogrammetry, which is the science of deducing the physical dimension of objects from measurements on photographs, including objects in the 3-dimensional world depicted in the images as well as the position and orientation of the camera when the image was taken. In that work, aerial or satellite imagery are stitched together to create near-orthographic, top-down views of the earth. However, such work does not address the difficulty of images that depict 3-dimensional scenes, because 3-dimensional scenes introduce foreshortening and parallax dilemmas that need not be dealt with in orthographic images.

As well, continuously-varying viewpoint images can be created from video captured by a continuously moving camera by compositing strips from each frame; examples include pushbroom panoramas [Gupta and Hartley 1997; Seitz and Kim 2002], adaptive manifolds [Peleg et al. 2000], and x-slit images [Zomet et al. 2003]. Pushbroom panoramas can be used to visualize long scenes such as streets, however, such images will typically look quite different from what a human would perceive when viewing the scene. Pushbroom panoramas have orthographic perspective in the horizontal direction and regular perspective in the vertical. Thus, crossing streets will not converge to a point, and objects at varying depths will be stretched non-uniformly.

In later work, Roman et al. [2004] took inspiration from the deficiencies of pushbroom panoramas and the examples of artist Michael Koller to devise an interactive system for creating multi-perspective images of streets. They allow a user to create an image with multiple x-slit regions; thus, the final result consists of rectangles of single-viewpoint perspective, separated by rectangles with continuously interpolated perspective. This work was the first to demonstrate the limitations of pushbroom panoramas as well as improvements over them, but there are several limitations to their approach. For one, they require a dense sampling of all rays along a camera path; this requirement necessitated a complex capture setup involving a high-speed 300 frame-per-second camera mounted on a truck that drives slowly down the street. Their use of video also severely limits output resolution compared to still cameras, and generates an immense amount of data that must be stored (and possibly compressed, resulting in artifacts). Moreover, since the video camera is constantly moving, short exposure times are required to avoid motion blur, which make it much more difficult to avoid the noise of higher ISO settings while achieving bright enough images from natural light. The output of their system, unlike that of artist Michael Koller, contains regions of continuously shifting viewpoint, which can appear quite different and often worse; for example, these regions often exhibit inverted perspective, where objects farther away appear bigger rather than smaller.

Finally, other attempts have been made to render a multi-perspective image from a series of singe perspective images of a scene. Photogrammetry can produce a 3-dimensional model of the scene represented by the collection of input images, as well as the camera positions and orientations. The input images are then projected into this 3-dimensional world in order to produce the multi-perspective image output. However, this 3-dimensional world is a complex and irregular surface, and these irregularities lead to common distortions. Moreover, there is no satisfactory way to stitch the images together without leaving tell-tale seams in the final output.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

One aspect of the claimed subject matter provides an architecture that facilitates producing a single image that can visualize a scene too large to depict from any single perspective view. An input to the architecture of the claimed subject matter can be a series of photographs taken from multiple viewpoints along a scene. For example, to depict the side of a street, one can simply walk along the other side and take hand-held photographs roughly every meter. The output of each photograph can be a single image that visualizes a portion of the street. These photographs can be stitched together to form a multi-perspective image of the entire extent of the scene captured in the input photographs.

Such visualizations of large scenes have the potential to be beautiful and artistic, but can also be of practical use for a variety of applications. For example, images of the sides of streets can be used for in-car navigation and to visually convey maps and directions through a city. A top-down view of a creek for several miles would be useful for geological visualization and to help monitor changes and erosion. Images depicting tourist destinations and activities such as long nature walks or the view from a long bridge could aid in advertising. The images created and described herein can contain visual information from multiple perspectives, and thus can be considered multi-perspective images.

According to another aspect of the claimed subject matter, the input images to the architecture can be captured by a walking person with a hand-held still camera along a camera path, and is therefore not limited by a requirement for enormous amounts of data that is typically derived from, or at least simulating (e.g., one image taken every millimeter), video input. Accordingly, the images of the scene can be of much higher quality and taken from camera locations that are anywhere from a few millimeters to several meters apart, or even up to miles apart, depending upon the size of the scene being imaged and the distance of the scene from the camera (e.g., the interval between each image can be a significant proportion of the size of the object being imaged).

In another aspect, a 3-dimensional model of the world depicted in the input images can be rendered. This rendering can employ projection matrices that describe the camera locations and orientations based upon feature points (e.g., dominant objects) within the 3-dimensional model. As well, a dominant depth can be selected, and a 2-dimensional picture surface can be stretched across the 3-dimensional model at the dominant depth to represent a multi-perspective view of the scene, as it would be seen from locations at a distance of the dominant depth away from the surface (e.g., a point on the camera path). The dominant depth can be, for example, based upon the dominant geometry and/or the feature points or based upon a depth that facilitates good alignment between features of the picture surface.

According to yet another aspect, the architecture can project the pixels of each of the input images onto the picture surface. Since many of the images will overlap one or many other images, many of the pixels from an image will overlap, and therefore be competing for the same location on the picture surface. When pixels overlap, the architecture can select the best pixel for each overlapping location based upon an objective function that is defined to accomplish the objectives of the pixel selection procedure. In this case, objectives are to select the pixel that produces the best results for stitching multiple images into a single multi-perspective image.

This objective can be quantified by minimizing the common distortions and creating an output that looks natural, contiguous and similar to what one would experience when viewing the actual scene. In particular, the objective function can employ at least one of a data cost function and a seam cost function. The data cost function can be a value that is proportional to the distance of a pixel from the center of an image that includes the pixel. The seam cost function can be based upon at least one of the consistency of the pixel with adjacent pixels, a strong edge in the picture surface at that location, and the dominant depth. By allowing the objective function to be the sum of the data cost and the seam cost, minimizing the objective function will yield the best pixel to be used at any location on the picture surface in which pixels overlap.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DESCRIPTION OF THE INVENTION

Figure 1:
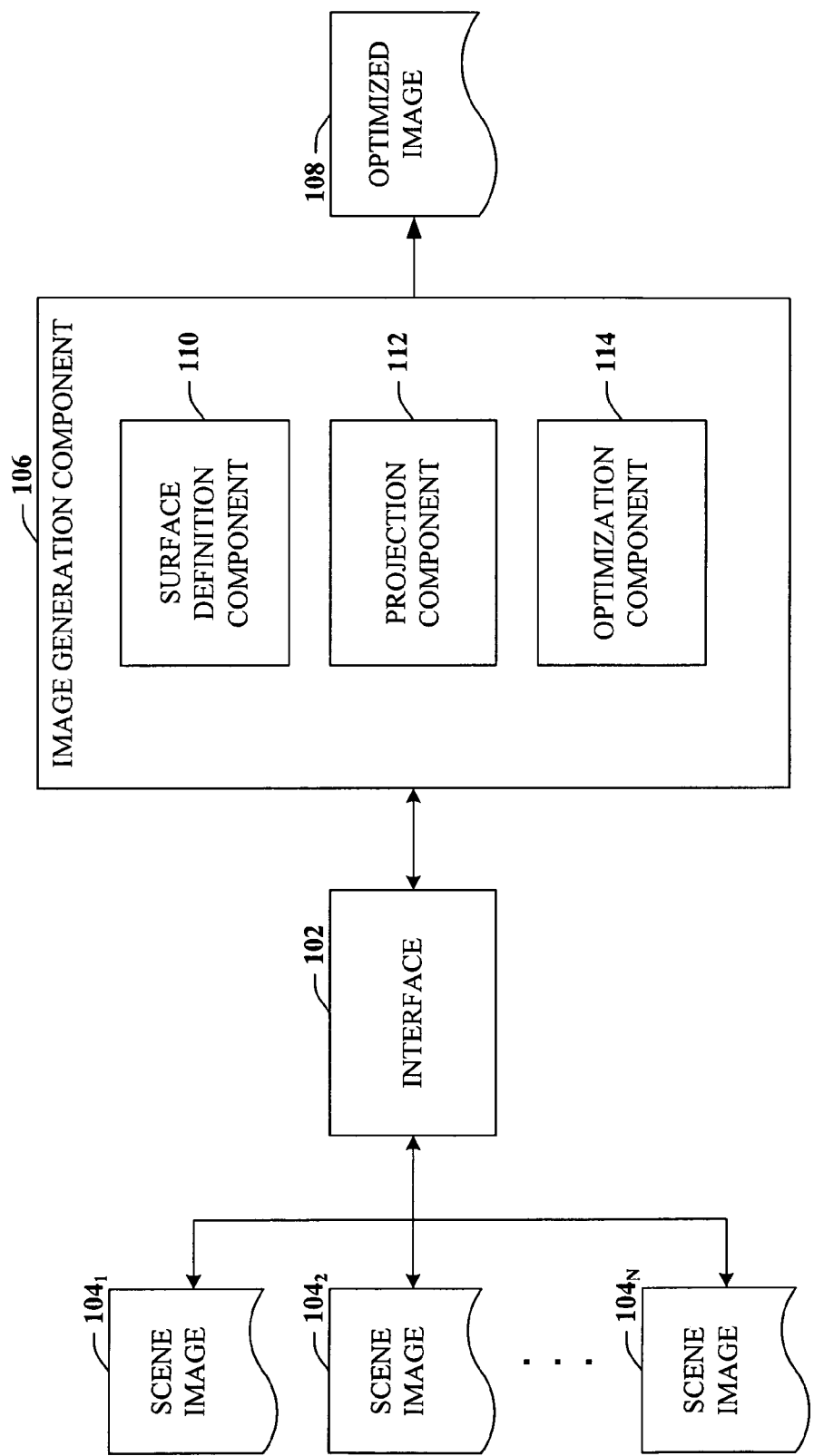
FIG. 1 is a block diagram that illustrates a system that facilitates optimized, multi-perspective digital image generation.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used herein, the terms "camera", "camera location", "camera view" and "camera path" can be described in the following manner. A camera refers to a device or plurality of devices capable of generating a photograph of an environment. A photograph is typically a still image in the visible light spectrum that generally represents a portion of a scene that is too large to be imaged from a single perspective. The term camera location generally refers to the position of, and in some cases the orientation of, the camera when the photograph or image was generated. Accordingly, the camera view can be defined as the focal field of view (e.g., frustum).

Finally, the camera path refers generally to a path that intersects a series of camera locations. The camera path can be, but is not required to be a straight line, but typically does not include an orbital rotation about the scene. Most often the camera path will follow a course adjacent to and substantially parallel to the scene.

According to an aspect of the claimed subject matter, an optimized, multi-perspective output image can be generated from a plurality of input images. However, since there are no comprehensive paradigm for defining what makes a multi-perspective output image "look good", the various difficulties involved must be explored. In abstract terms, the output image should appear natural, continuous, and roughly similar to what one would experience when walking along the camera path and looking at the scene. It is, of course, not possible to always obtain perfect representation of a 3-dimensional world with a static 2-dimensional image, since the 3-dimensional world contains varying depths.

Even if the complete knowledge of the geometry and appearance of the world is available, it is not often clear how to render an ideal, continuous, multi-perspective image. The most obvious answer would be to render an orthographic view, but this would lack the perspective foreshortening effects (which are useful as depth cues) the observer would see when, for example, standing on the street and looking at the other side of the street. A rendered pushbroom panorama would also introduce distortions. One implication is that there is no ground truth or gold standard by which we can measure the accuracy of our visualization; photo-realism is not perfectly defined in this case.

However, examples of good multi-perspective visualizations such as those of Michael Koller exist, and an ordinary spectator can tell a good image when he sees it. Thus, to some degree, the properties, in image-space, of a good result can be defined. For example the output image can be composed of regions of linear perspective seen from a viewpoint where a person would naturally stand, e.g., a city block should be viewed from across the street, rather than some far away viewpoint with an obscured field of view and the loss of many natural depth cues. The seams between these regions should not draw attention; thus, the image should appear natural and continuous. Also, each object in the scene can be rendered from a viewpoint roughly in front of it to yield a depiction with the least perspective distortion.

The difficulties introduced by parallax can be mitigated by assuming that the scene has a dominant depth. For a street scene, this depth will typically lie at the front of the buildings on the other side of the street. Therefore, objects at this depth should be imaged as accurately as possible. By accuracy, it is generally inferred that these objects should be imaged only once and in their entirety, and that the arrangement of these objects in picture space should resemble the mental model of their arrangement in physical space. Objects farther away from this dominant depth can be assumed to be are less important, and thus more liberties can be taken when rendering the objects not at the dominant depth.

However, defining the liberties that are acceptable in concrete terms is again elusive, though in the context of an example (such as a street scene) easier to express. For example, cars and landscaping are examples of objects that are often found off of the dominant depth. It is, therefore, usually considered acceptable to occasionally omit such objects from the output image. It is also generally considered acceptable to alter the geometry of the landscaping, such as shortening a bush or pruning a tree, as long as the bushes and trees still look like natural bushes and trees. It is not considered acceptable to non-uniformly scale or distort an object.

Accordingly, a car, or a leaf on a tree, should not appear stretched or squashed. Also, the relative scales of objects should not appear unnatural; objects closer to the camera path should be bigger, and all the cars should be of similar size in picture space, especially those at the same depth.

Referring initially to FIG. 1, a computer implemented system 100 that that facilitates optimized, multi-perspective digital image generation is depicted. Generally, the system 100 can include an interface 102 that receives a plurality of images $104_1$-$104_N$, referred to collectively or individually as image(s) 104. It is to be appreciated that although the images 104 can be referred to collectively, hereafter respective images 104 can have unique properties that distinguish each of images 104. The plurality of scene images 104 can correspond to a plurality of camera locations along a camera path. Both camera locations and the camera path are described in more detail with respect to FIG. 5, infra. It is to be appreciated that the format of the images 104 can be converted into other formats and/or rendered to accentuate desired characteristics of one format over another by the interface 102 and/or the image generation component 106.

Each respective image 104 can depict a portion of a 3-dimensional scene from the point of view of one of the plurality of camera locations. The 3-dimensional scene can include substantial parallax and/or foreshortening characteristics, visible from the vantage point of the camera locations, and is most often too large to be captured by a single perspective, but can be imaged in the entirety with a series of single perspective images, such as images 104. The image generation component 106 can receive the images 104 from the interface 102 and can generate an optimized image 108. The optimized image 108 can be a multi-perspective image generated by stitching the images 104 into a single, cohesive output that resembles a view an observer would see when looking at the scene.

It is to be understood that while the images 104 are typically single perspective images, one or many of the images could also be a multi-perspective image, such as the optimized image 108. For example, suppose, as above, an optimized image 108 is generated from a series of images 104 that depict a street scene. Subsequently, the scene is altered and additional buildings are constructed, for example, extending the length of the street scene (or even replacing other buildings that previously existed). This extended scene can be subsequently photographed with a new input image(s) 104 and passed to the image generation component 106 along with the previous optimized image 108. In essence, subsequent new input image(s) 104 that represent the extended scene can be stitched to the previous optimized image 108 that represents the original scene before the additions, to yield an updated optimized image 108.

The image generation component 106 can generate the optimized image 108 by employing a surface definition component 110, a projection component 112 and an optimization component 114. The surface definition component 110 can determine a dominant depth for the scene and generates a 2-dimensional picture surface at the dominant depth. The surface definition component 110 can compute projection matrices for each photograph within a global coordinate framework, for example, by employing a structure from motion algorithm described by Hartley and Zisserman [2004]. Because the images 104 are typically a sparse set of photographs rather than a continuous video stream, conventional correlation-based alignment will not work well. Rather, point matches between images 104 can be computed, for example, by utilizing the SIFT feature descriptor described in Lowe [2004] and Lowe and Brown [2005]. The surface definition component 10 can then optimize the projection matrix parameters by, for example, using sparse bundle adjustment described by Hartley and Zisserman [2004].

Accordingly, the surface definition component 110 can determine the location, orientation and projection matrices for each camera based upon the images 104, as well as a sparse cloud of 3-dimensional points that describe the scene geometry, such as feature points (e.g., dominant objects or important features within the scene). It is to be appreciated that the path of the camera (e.g., the camera path upon which lie the camera locations) may not be a straight line. Moreover, even if the camera path were a straight line, drift in the alignment (e.g., due to slightly different camera orientations between the images 104) may produce a curve. Thus, a cubic Bezier spline can be fitted to the camera path, using, for example, Schneider's algorithm described by Schneider [1990].

The surface definition component 110 can render a 3-dimensional model that represents the scene and aligns the coordinate frame of the structure from motion output with the expected coordinate frame. For example, the ground plane is typically the x-y plane, with the camera path progresses along the x-axis and lampposts point along the z-axis. (See FIGS. 5-8). To the accomplishment of this alignment, the vectors that are the most and least perpendicular to the optical axis of each camera view can be computed in a least squares sense, e.g., by employing a singular value decomposition.

Accordingly, the most perpendicular vector can be defined as the new z-axis, the least perpendicular can be defined as the new y-axis, and the x-axis as their cross product. In some cases, defining the coordinate system in this manner may not work well. For example, if the images 104 were produced by a camera that was not pointed directly at the objects in a scene (for example, the photographer may tilt the camera up to capture the top of buildings). Hence, in those cases, the surface definition component 110 provide for a means such that a user can select features that define the new coordinate system, rather than having it automatically defined as described supra.

With the coordinate system delineated, the surface definition component 110 can define a 2-dimensional picture surface that resides within the 3-dimensional dimensional model and can represent the canvas or surface upon which the multi-perspective view of the scene depicted by the images 104 will be stitched. Accordingly, the optimized image 108 can be generated directly on this picture surface. To define the surface, the surface definition component 110 can push the Bezier spline camera path down the y-axis by an amount equal to the dominant depth. The dominant depth can be resolved by selecting the y-axis depth in the 3-dimensional model at which the dominant geometry of the model lie (e.g., the front of the buildings on the opposite side of the street in the street scene example above). Additionally or alternatively, the dominant depth can be selected based upon the alignment of other feature points within the 3-dimensional model. The surface definition component 110 can sweep the spline up and down the z-axis to form a surface. This surface can have a regular grid whose x-axis can be defined by evenly sampling the Bezier spline [Salomon 1999], and whose z-axis can be defined as how far the spline is swept up or down the z-axis.

The projection component 112 can project each pixel of an image 104 from the plurality of images 104 onto the picture surface, which can ultimately be rendered into the optimized image 108. This can be achieved by taking the recovered projection matrix of each camera and projecting the corresponding image 104 onto the picture surface, by copying the color of the pixel in the image 104 and pasting that pixel color at the corresponding pixel location on the picture surface. For example, the projection component 112 can create a projected image $P_i$ for each source image $C_i$ (e.g., image 104) by sampling the projected image onto the regular grid of the picture surface. In addition, the projection component 112 can also identify overlapping pixels. For example, when a pixel is projected onto the picture surface to a location in which another pixel was already projected (due to an overlap in the camera views of the images 104), these are considered to be overlapping pixels. Obviously, only one of the overlapping pixels can exist in the final optimized image 108, thus the image generation component 106 must choose between the overlapping pixels.

To that end, the optimization component 114 can select a best pixel to be projected from among the overlapping pixels based on an objective finction. It is to be appreciated that any number of pixels from any number of images 104 can overlap the same pixel location, the number bound only by how many images 104 include the location of the scene that is represented on the picture surface by the overlapping pixels. However, overlapping pixels are typically compared in groups of two, the pixel from a previous image 104 currently at that location on the picture surface, $p_1$ and $p_2$, the pixel that is determined to project to the same location on the picture surface from another image 104.

In order to select the best pixel, the optimization component 114 can take into account the effects of foreshortening and parallax described supra. Given this abstract description of the difficulties, more concrete terms of those difficulties can be considered. For example, it can be assumed that the images 104 are depictions taken at known (e.g., computed) locations along the camera path. Thus, it can also be assumed that we know the locations and viewing parameters of the images 104, as well as a dominant depth that contains the important objects. Furthermore, it can be assumed that the camera path roughly follows the x-axis. (See FIGS. 5-8). As described above regarding the surface definition component 110, the picture surface can be defined by pushing this camera path into the scene by the dominant depth, and then sweeping it up and down the z-axis. The surface definition component 110 can then project each image 104 onto this picture surface. The projected photographs should overlap at certain locations, just as the images 104 overlap (assuming the cameras are closely spaced), and thus each point on the picture surface can choose to copy its color from one of several overlapping images 104.

Thus, one difficulty is choosing the best pixel from among the overlapping images 104 at each point on the picture surface to best satisfy the goals outlined in the previous section involving parallax and other depth cues. In mathematical notation, the picture surface can be defined as having a regular 2-dimensional grid, and any point on this grid can be described with a 2-dimensional vector p. Each point p can be projected into each camera $C_i$. This projection can be referred to as $P_{i(p)}$, which returns the RGB color (e.g., 3 8-bit values ranging from 0-255) or similar format at the projected location in image i (e.g., image 104). Generally, $P_{i(p)}=0$ if this projected location is outside of the field of view of camera i. As well, for each point p, a source image l can be chosen from which to copy its color. This matrix of choices can be referred to as 1 such that there can be n source images (e.g., images 104), $1 \leq l(p) \leq n$ for each p. Thus, each point p on the picture surface can have color $P_{l(p)}(p)$, once l has been computed.

Given this problem setup, several objectives are already satisfied. The input images 104 are already captured from natural viewpoints. Given that the cameras locations are not so closely spaced as to approximate video, the output generally will not contain any regions of smoothly interpolated viewpoints. Thus, the output is unlikely to contain non-uniform scaling or distortion, and relative sizes of objects should be natural. Finally, it should be simple to accurately depict objects at the dominant depth, since these objects will line up along the picture surface between the different cameras. To compute the best final output image according to the goals outlined above, we can choose the values of l(p) for each p to give the best possible output image. This can be accomplished by minimizing an objective function of a standard Markov Random Field (MRF) form. The objective function can sum a data cost D(p) over each p, as well as a smoothness cost S(p,q) over each pair of neighboring points p,q (each point has four neighbors on the regular grid). These data and smoothness costs can be defined such that they measure how well the output image (e.g., the optimized image 108) defined by l(p) satisfies the goals outlined above.

According to an aspect of the claimed subject matter the cost functions can be defined in a very simple fashion. Since we would normally not wish to copy pixels from outside the field of view of each camera, $D(p)=\infty$, if $P_{l(p)}(p)=0$. Otherwise, since we wish to depict each object from a viewpoint roughly in front it, the data cost D(p) can be proportional to the distance from the center of image i, if l(p)=i. The smoothness cost can be defined according to the goal that the output image be natural and continuous. For example, one way to satisfy the objects stated above can be measured with the following smoothness cost:

$S(p,q) = (|P_{l(p)}(p) - P_{l(q)}(p)| + |P_{l(p)}(q) - P_{l(q)}(q)|) / (E_{l(p)}(p,q) + E_{l(q)}(p,q))$, where $E_i(p,q)$ is the scalar edge potential in image i between pixels p and q, computed using a Sobel filter. This smoothness term can encourage seams between two images at two neighboring pixels where the images 104 agree, as well as at places a seam where strong edges exist. Generally, overlapping images 104 will agree where the scene geometry intersects the picture surface; thus, these areas will typically be good locations to place seams. This smoothness cost can also discourage placing seams where overlapping images 104 do not agree; this disagreement will most often occur for objects off of the dominant depth, or in areas where objects on the dominant depth exhibit non-Lambertian effects such as specular highlights. However, this smoothness cost will sometimes encourage placing seams for objects off of the dominant depth if the object is uniformly colored or stochastically textured, since seams can easily be hidden in these areas.

These tendencies of the smoothness function explain why it can yield a result that conforms to objectives described supra. The optimization of the cost functions (e.g., data cost and seam cost) of the objective function can route seams around objects, such as trees and cars off of the dominant depth, that do not line up where the images 104 overlap. Where the images 104 line up, the algorithm can jump viewpoint without the viewer noticing. However, the more of the scene that lies along the dominant depth, the better this approach will work. On the other hand, if there are too many tree and cars off the dominant depth, problems could arise.

Hence, the optimization component 114 can employ graph cuts as described by Boykov et al. [2001] to optimize the MRF objective function defined earlier. Given a final matrix l(p) for each point p on the regular grid, we can copy colors from $P_{l(p)}$ for each p to create the final image (e.g., the optimized image 108). The seams between regions should not draw attention so as to facilitate a complete image that appears natural and continuous. Moreover, each object in the scene to be rendered can be shown in the optimized image 108 from a viewpoint roughly in front of that object. Accordingly, most objects can be depicted with the least perspective distortion. It is to be appreciated that the seam cost can be modified to take advantage of other characteristics of stitching together a multi-perspective image that conform to the above objectives.

For example, there are other types of seams that may not be visually noticeable that our architecture can take advantage of, such as seams created by a depth discontinuity. Because of a depth discontinuity, an observer can expect to see some partially occluded object at the edges of the object in the foreground, but an observer would not generally be able to predict exactly which object (or where on an object) should be seen in the background. This implies that a very convenient seam can be found at the edges of objects with a depth discontinuity, such that the stitching can transition from one image 104 to the next image 104 at this edge as long as that camera sees an object at a depth greater than the depth of the object in the foreground. (See FIG. 8).

In more concrete terms, consider two neighboring pixels, p and q, on the picture surface, with the color for p from image $C_i$, and the color for q from image $C_j$. If there is a depth discontinuity in image $C_j$ between p and q, and the depth at q is less than the depth at p, then the depth of $C_j$ at q is also less than the depth of $C_i$ at p. In that case, the seam should appear natural, so it would be a very good place to make the transition from $C_i$ to $C_j$. Taking advantage of this kind of seam would require knowledge of depths and depth discontinuities in the source images, which could be calculated using multi-view stereo techniques described by Zitnick et al. [2004].

Figure 2:
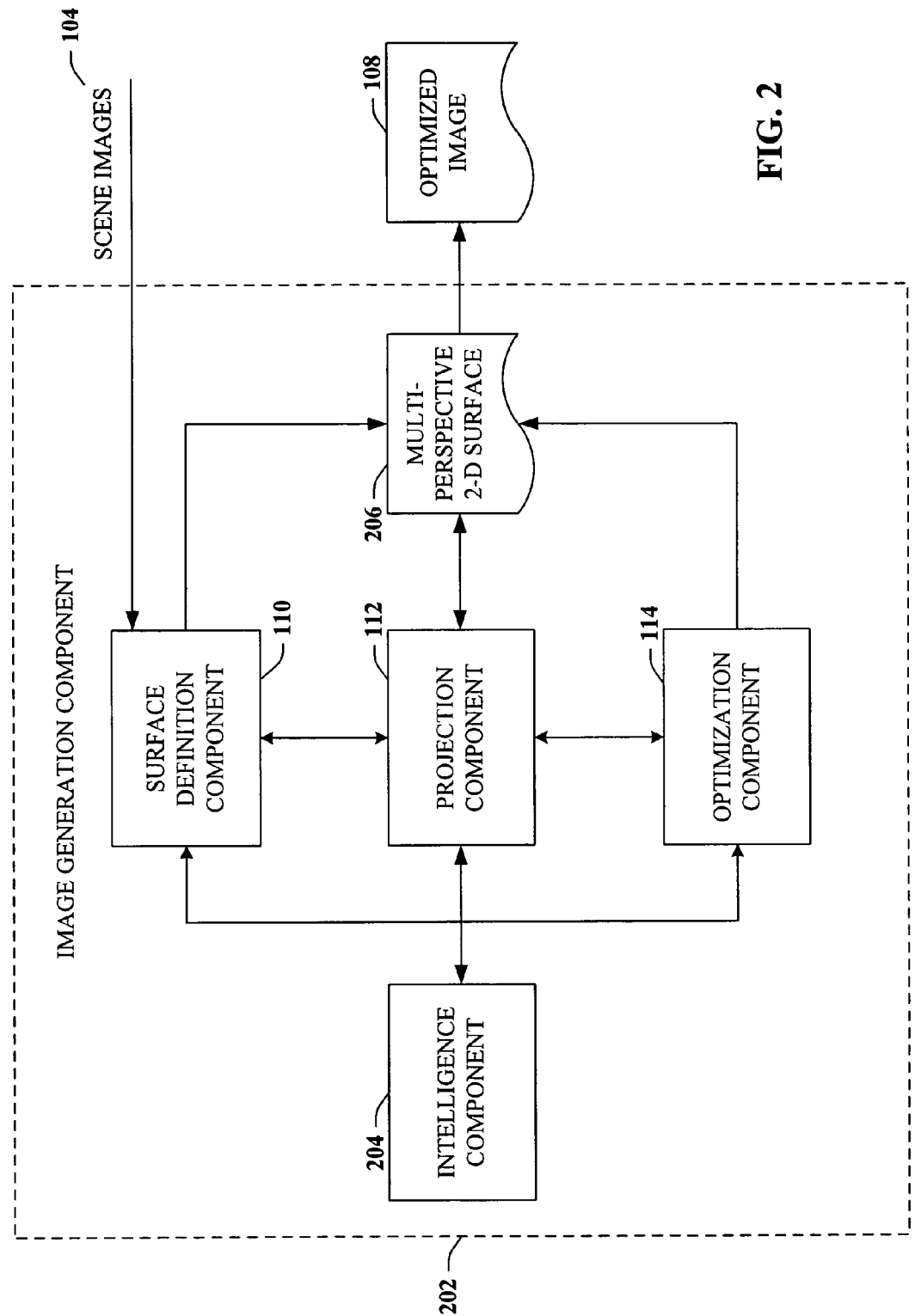
FIG. 2 is a block diagram that illustrates a system includes an intelligence component that facilitates optimized, multi-perspective digital image generation.

Referring now to FIG. 2, a computer implemented system 200 that facilitates optimized, multi-perspective digital image generation is depicted. Generally, the system 200 can include an image generation component 202 that receives a plurality of images 104 and generates the optimized image 108. The image generation component 202 is substantially similar to the image generation component 106 described with reference to FIG. 1, but also generally includes an intelligence component 204 and a multi-perspective 2-dimensional surface 206. The multi-perspective 2-dimensional surface 206 is substantially similar to the picture surface described in supra.

The surface definition component 110 can receive the images 104 that depict a scene, and can determine a dominant depth for the scene and can generate a 3-dimensional model of the scene as well as the multi-perspective 2-dimensional surface 206 at the dominant depth. The projection component 112 can project the pixels an image 104 from the plurality of images 104 onto the multi-perspective 2-dimensional dimensional surface 206 and can identify the overlapping pixels. The optimization component 114 can select a best pixel to be projected from among the overlapping pixels based one or several cost functions that summarize certain objectives.

The intelligence component 204 can communicate with the components 110-114 to add material functionality. For example, the intelligence component 204 can employ item recognition to determine important objects in the scene, which could be employed, for example, by the surface definition component 110 when identifying or inferring feature points and in determining the dominant depth (e.g., inferring when certain features are of particular importance to the ultimate output, even though these features are not among the dominant features of the scene). Similarly, such item recognition could be employed by the optimization component 114 to aid in making the graph cuts through objects and/or as an alternative or addition to the detection of depth discontinuities (e.g., if the scene is of a building that is partially occluded by a tree, by recognizing these items, it can be inferred that there is a depth discontinuity). Similarly, the projection component 112 can employ the intelligence component 204 to optimize the pixel projection. For example, there may be many good images 104 that have already been employed to examine overlapping pixels, while successive images 104 show that location at increasing lengths off the center point. In some cases, for example to be determined or inferred by the intelligence component 204, it can be assumed that the later images 104 will not yield a best pixel for a given location, and, as such, the cost analyses need not be performed.

It is to be appreciated that although the intelligence component 204 is depicted as a feature of the image generation component 202, interfacing other components, intelligence component 204 could also be included as a self-contained component of any of the components 110-114. The intelligence component 204 can provide for reasoning about or infer states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data.

Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 3:
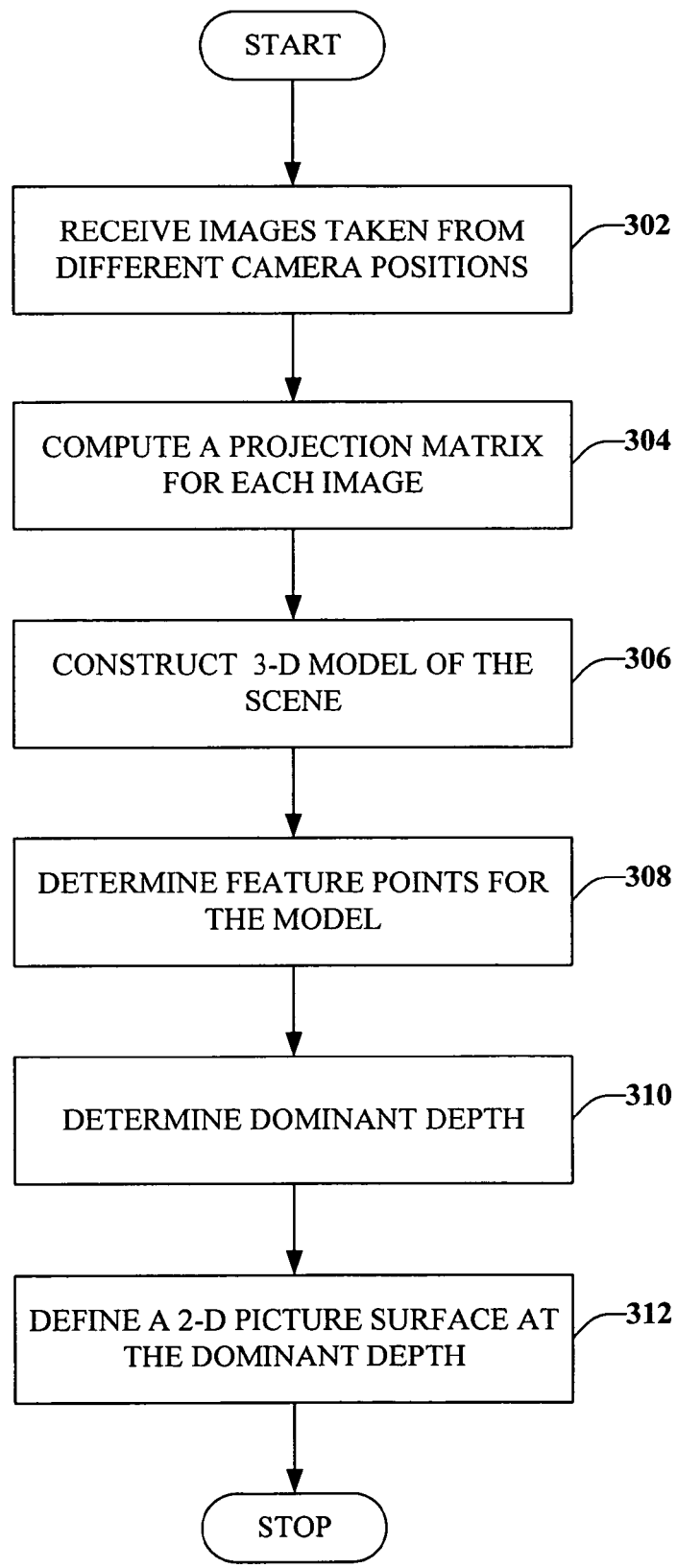
FIG. 3 depicts an exemplary flow chart of procedures that facilitates generating a 2-dimensional picture surface of a scene.

FIG. 3 illustrates methodology 300 in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 3, an exemplary computer implemented methodology 300 that facilitates generating a 2-dimensional picture surface of a scene is displayed. At 302, a plurality of images can be received. Typically, these images will be a series of digital images taken from different camera locations along a camera path that depict a scene too large to be viewed from a single perspective. At 304, the projection matrices for each image can be computed. The projection matrices can map the camera locations as well as the camera orientations for each input image based upon common features and/or dominant geometry of the scene as depicted by at least a subset of the images. This can be accomplished, for example, by employing structure for motion algorithms.

At 306, a 3-dimensional model of the scene can be rendered that describes the global geometry of the scene relative to the camera locations along the camera path. It is to be appreciated that the path of the camera may not be a straight line, and even so, drift in the alignment may produce a curve. Therefore, for example, a cubic Bezier spline can be matched to the camera path using an algorithm such as Schneider's algorithm. Accordingly, as detailed supra, vectors that are the most and least perpendicular to the optical axes of each camera image input can be computed. For example, this computation can employ a least squares operation using a singular value decomposition. Thus, the most perpendicular vector can now be defined as the new z-axis; the least perpendicular can be defined as the new y-axis; and the x-axis can be defined as the cross product of the y and z axes. At 308, the feature points of the model can be determined, which can be used at 310 to determine the dominant depth.

At 312, a 2-dimensional picture surface can be mapped across the 3-dimensional dimensional model at the dominant depth. It is to be appreciated that the picture surface can be projected from a recovered 3-dimensional scene, and the output image can be formed directly on this picture surface. To define this surface, the Bezier spline camera path can be "pushed" down the y-axis by an amount equal to the dominant depth. Then, the spline can be swept up and down the z-axis to form a surface. This surface can have a regular grid whose x-axis is defined by evenly sampling the Bezier spline, and whose y-axis can be defined by how far the spline is swept up or down the z-axis. Since the dominant depth is the rendered distance between the picture surface and the camera path, the picture surface can represent a multi-perspective view of the scene, as it would be seen from a location from the dominant depth (e.g., a point on the camera path). It is to be appreciated that the dominant depth can be determined at act 310 based upon the feature points found at act 308 (e.g., the dominant geometry of the model) or based upon the alignment of objects in the picture surface.

Figure 4:
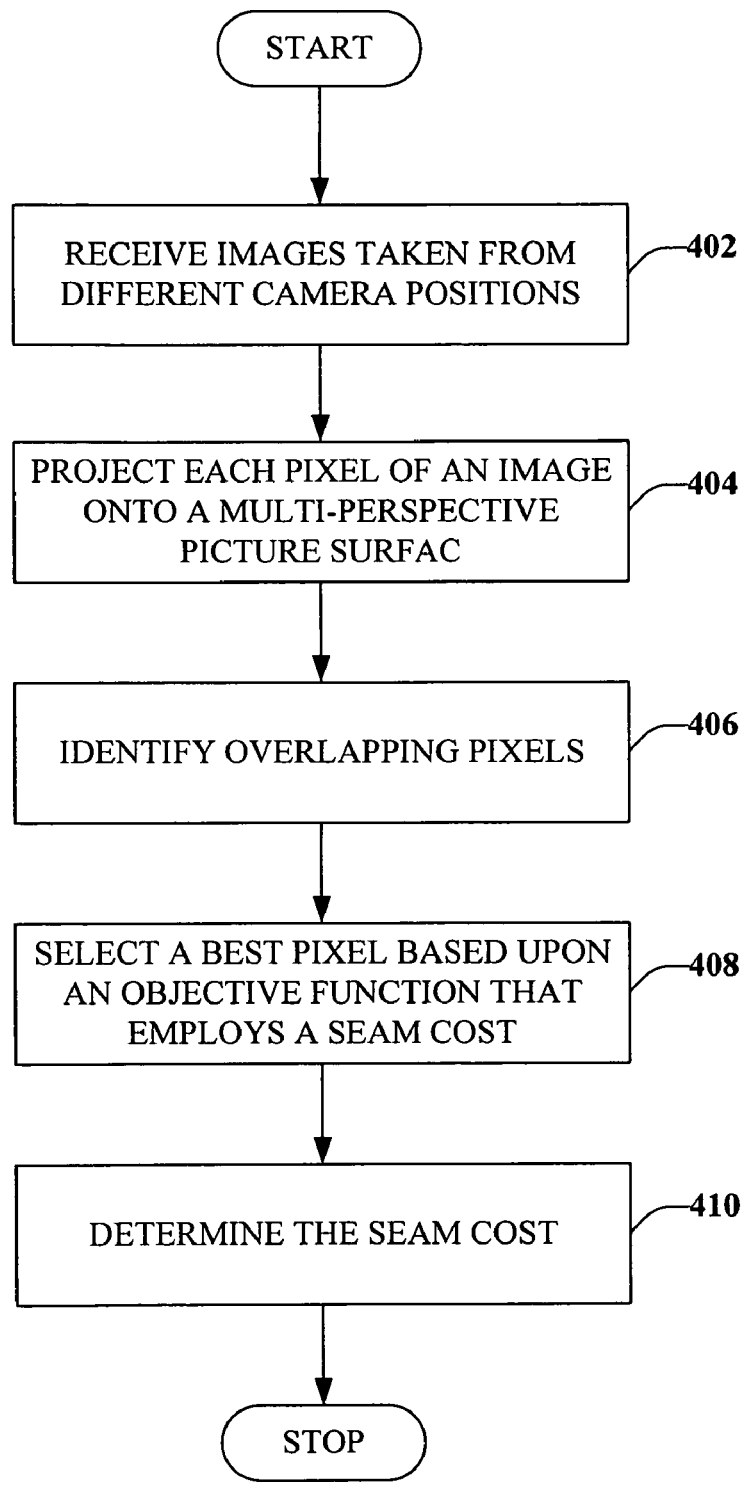
FIG. 4 illustrates an exemplary flow chart of procedures that facilitates optimizing a multi-perspective picture surface.

Turning now to FIG. 4, an exemplary computer implemented methodology 400 that facilitates optimizing a multi-perspective picture surface. At 402, a plurality of images can be received that depict a scene too large to be viewed from a single perspective. Typically, these images will be an ordered collection of images taken from different camera locations along a camera path. At 404, each pixel of an image can be projected onto a multi-perspective picture surface, by, for example, copying the pixel's color to the corresponding location on the picture surface. At 406, overlapping pixels can be identified, e.g., when a pixel from a first image is projected to the surface area and a pixel from a second image is projected to the same location.

In the case of overlapping pixels, at act 408, a best pixel can be selected based upon an objective function that can be a mathematical description of the objectives sought to be attained. The objective function can employ a data cost and a seam cost. Accordingly, the best pixel could be the overlapping pixel that yields the lowest objective function value, wherein the objective function is the sum of the data cost and the seam cost. Typically, the data cost corresponds to the distance from the center of an image to the location of the pixel. The seam cost can be determined at act 410. For example, the seam cost for a pixel can be based upon at least one of the uniformity between adjacent pixels, an edge feature in the picture surface at the location of the pixel, whether or not the pixel resides at the depth, whether there is a depth discontinuity between the pixel and one of the neighboring pixels, and whether an intelligence component has determined (e.g., via item recognition) that the pixel location is a good location for a seam.

Figure 5:
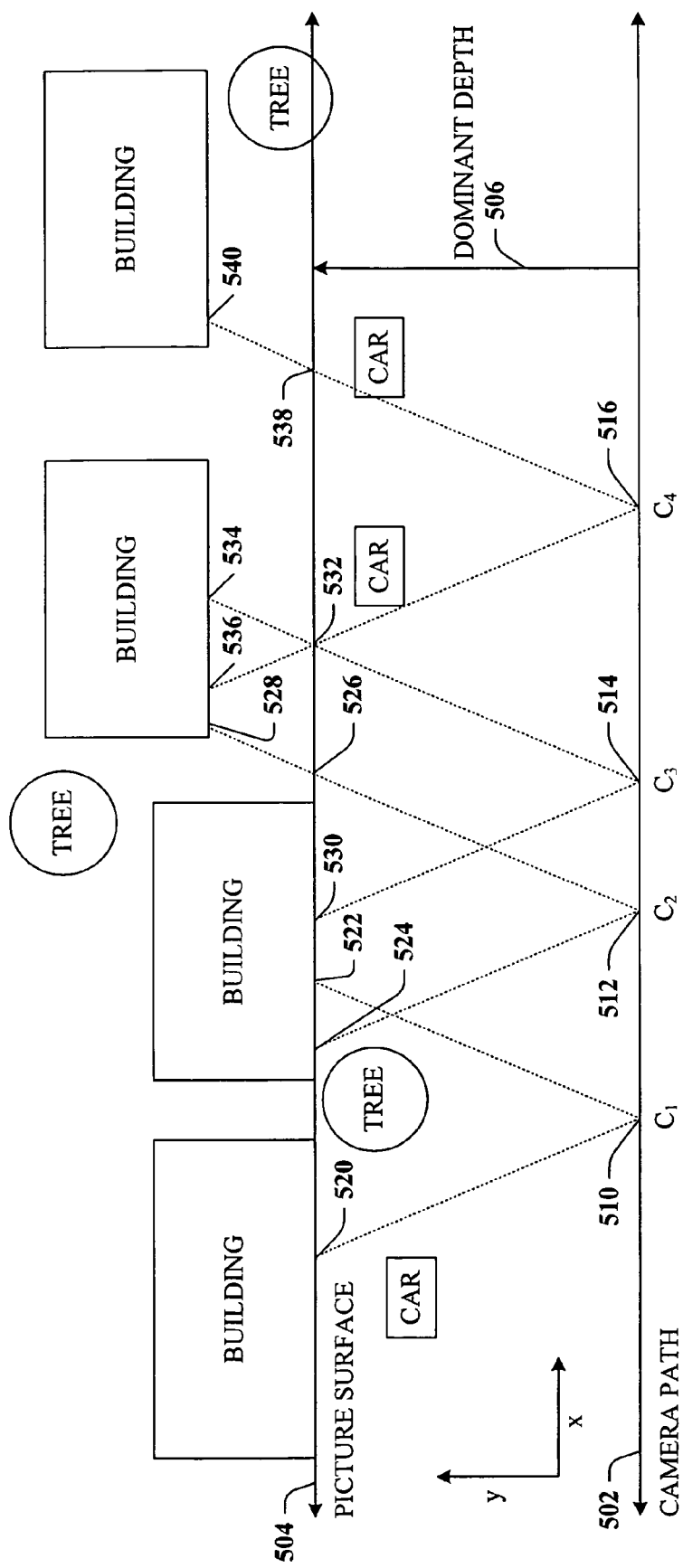
FIG. 5 illustrates an exemplary slice of an orthogonal view of a 3-dimensional model that represents a 3-dimensional scene with overlapping images taken from a camera path projected onto a picture surface.

Referring to FIG. 5, an exemplary environment 500 that generally includes a camera path 502 and a picture surface 504 at the dominant depth 506 is illustrated. The environment 500 can be, for example a rendered 3-dimensional model of a scene captured by a number of images taken at intervals along the camera path 502. The environment 500 (and similar environments describe infra regarding FIGS. 6 and 7) is provided to emphasize various novel features of various aspects of the claimed subject matter, and is not intended to be limiting, but rather to solidify concepts already described herein. Accordingly, the discussion of the environment 500, as well as those detailed below, can provide useful understanding for the concepts introduced supra, regarding FIGS. 1-4.

The environment 500 shows an x-y slice of the space described in the example above. The scene that is modeled consists of buildings, cars, and trees. The photographer can walk along the camera path 502 (in this case a straight line), and can photograph the scene at intervals of, e.g., about a meter or so. Here we highlight four camera locations $C_1$ through $C_4$ that are labeled 510, 512, 514 and 516, respectively. The viewing frustums are also for these locations are also shown. The picture surface 504 can be created by pushing the camera path 502 along the y-axis to the dominant depth 506, which in this case is the depth of the two buildings on the left. Notice that when images $C_1$ and $C_2$ are projected onto the picture surface, the colors of the pixels projected should agree in the overlapping region since the front of the building they depict lies exactly at the picture surface (assuming Lambertian, perfectly planar buildings). When the images of objects are off of the picture surface, however, the colors will not generally agree due to parallax.

Accordingly, camera locations 510, 512, 514 and 516, that can be defined as the location on the camera path 502 from which an input image was taken. An image taken from camera location 510 (i.e., $C_1$) will generally create a camera view that is bound by the conical frustum swept out from 510 to the picture surface 504, with the limiting edges of the camera view show at 520 on the left and 522 on the right. Similarly, the camera views for the other camera locations 512-516 intersect the picture surface 504 at the maximum width at 524 and 526 for camera location 512, 530 and 532 for camera location 514, and 532 and 538 at camera location 516. The field of view extends beyond the picture surface 504 to end at geometry off the dominant depth 506 at 528, 534, 536 and 540. Among these intersections are several overlapping portions, for example, the area on the picture surface 504 bound by 522 and 524. Additionally, the area between 528 and 530 show that a segment of the overlapping area falls off the dominant depth 506, as does the area between 534 and 536, which also shows a depth discontinuity for the field of view of camera location 516 due to the car occluding some portion of the camera view to the right of 536. Each of these situations will be described.

Figure 6:
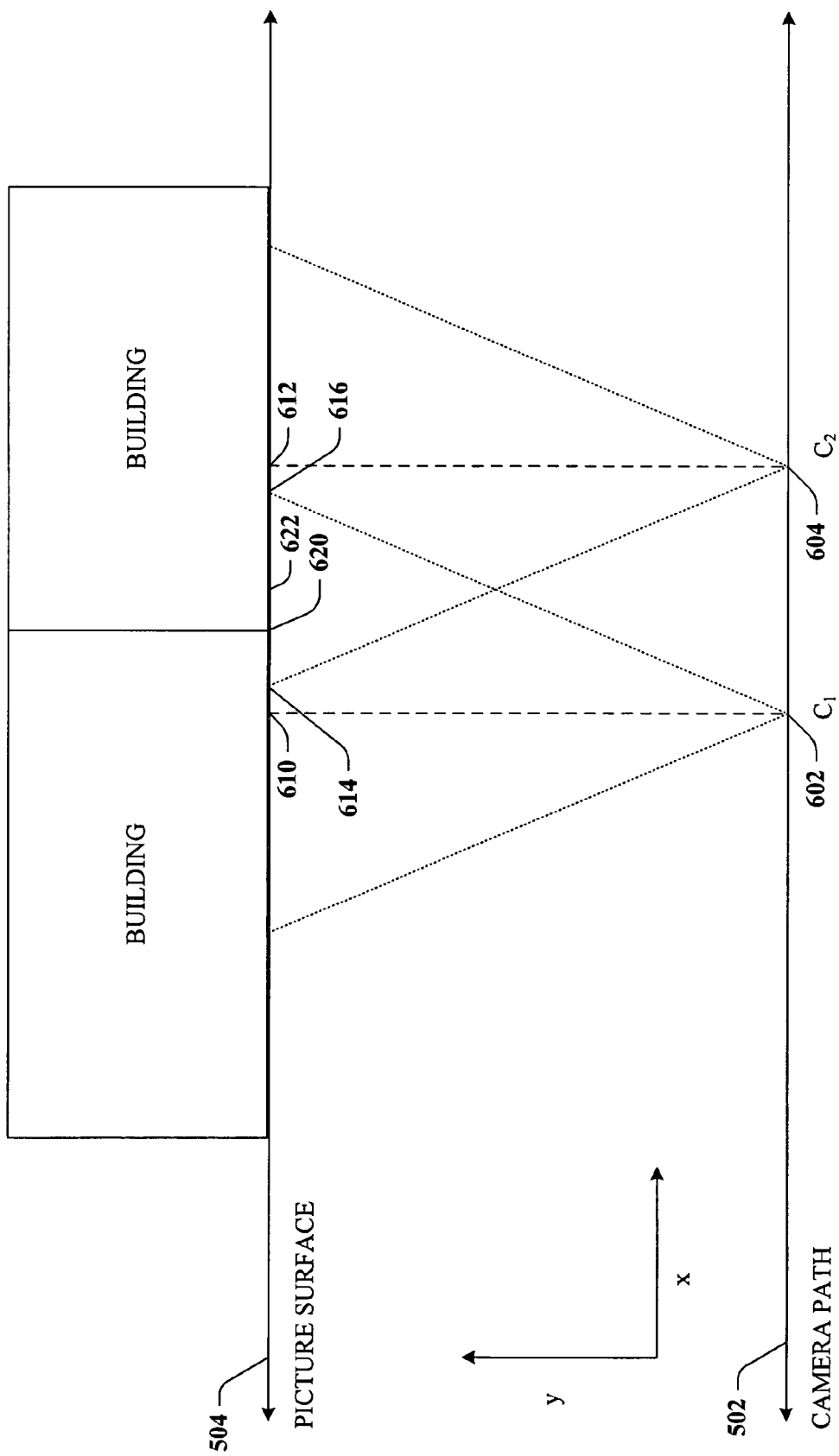
FIG. 6 depicts an exemplary slice of an orthogonal view of a 3-dimensional dimensional model with the midpoint between the center points of two camera views very near to a strong edge.

Turning now to FIG. 6, an environment 600 that generally comprises the camera path 502 and the picture surface 504 is shown. The dominant geometry of the scene and the environment 600 are the buildings that lie on the picture surface 504. Two camera locations, 602 and 604 are illustrated wherein the center of camera location 602 is shown at 610 and the center of the camera location 604 is shown at 612. The two camera views have an overlapping area bound by 614 and 616. Within this overlapping area is an obvious strong edge where the buildings meet at 620 and the midpoint between the center of the camera views 602 and 604, which is labeled 622. Thus, all the pixels to the left of 622 are closer to the center of an image taken from 602, while all the pixels to the right are closer to the center of an image taken from 604.

Accordingly, when the architecture described above attempts to make the transition from camera location 602 to camera location 604, the strong edge at 620 will be one possible point in which to make the switch (because seams are easily hidden in edges). As well, the midpoint at 622 can also be a good location to make that transition due to the tendencies of the data cost function. The data cost function will typically ascribe a higher cost for pixels from camera location 602 that fall to the right of 622 (because of edge distortion) than it will ascribe to pixels from camera location 604 and vice versa.

Hence, all other things being equal, in this case the data cost function will probably favor stitching the two images taken from camera locations 602 and 604 at 622, whereas the seam cost function will probably favor location 620. However, since the dominant geometry lies on the picture surface 504, the seam cost will be less of an issue (because both images will agree very well in this case). Therefore, minimizing the objective function will probably favor a transition from 602 to 604 at location 622. However, in FIG. 7, a slightly different situation is presented.\

Figure 7:
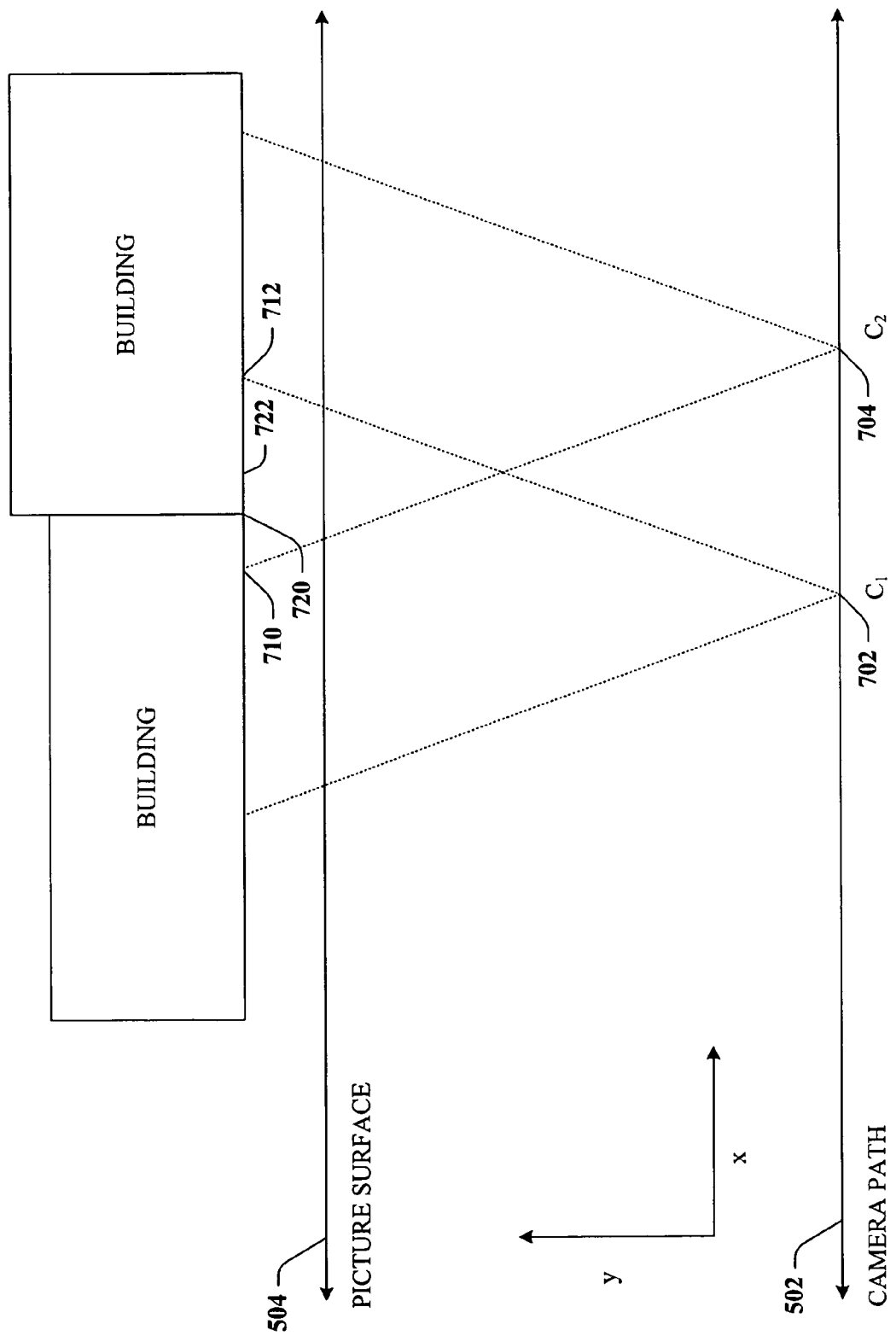
FIG. 7 illustrates an exemplary slice of an orthogonal view of a 3-dimensional model with the midpoint between the center points of two camera images very near to a strong edge when the feature points are not on the picture surface.

Referring briefly to FIG. 7, an environment 700 is depicted. The environment 700 generally includes the camera path 502, the picture surface 504 and two camera locations 702 and 704. The camera views overlap between 710 and 712, with a strong edge at 720 and the midpoint 722. As in FIG. 6, supra, the data cost finction will favor a transition at 722 whereas the seam cost function will favor a transition at 720. However, in this case, the dominant geometry within the segment of the scene depicted by the two camera locations 702 and 704 lies off the dominant depth (e.g., does not lie on the picture surface 504). Accordingly, there is less likelihood that the respective images will agree nicely. Therefore, in this case the objective function will probably favor making a transition at 720.

Figure 8:
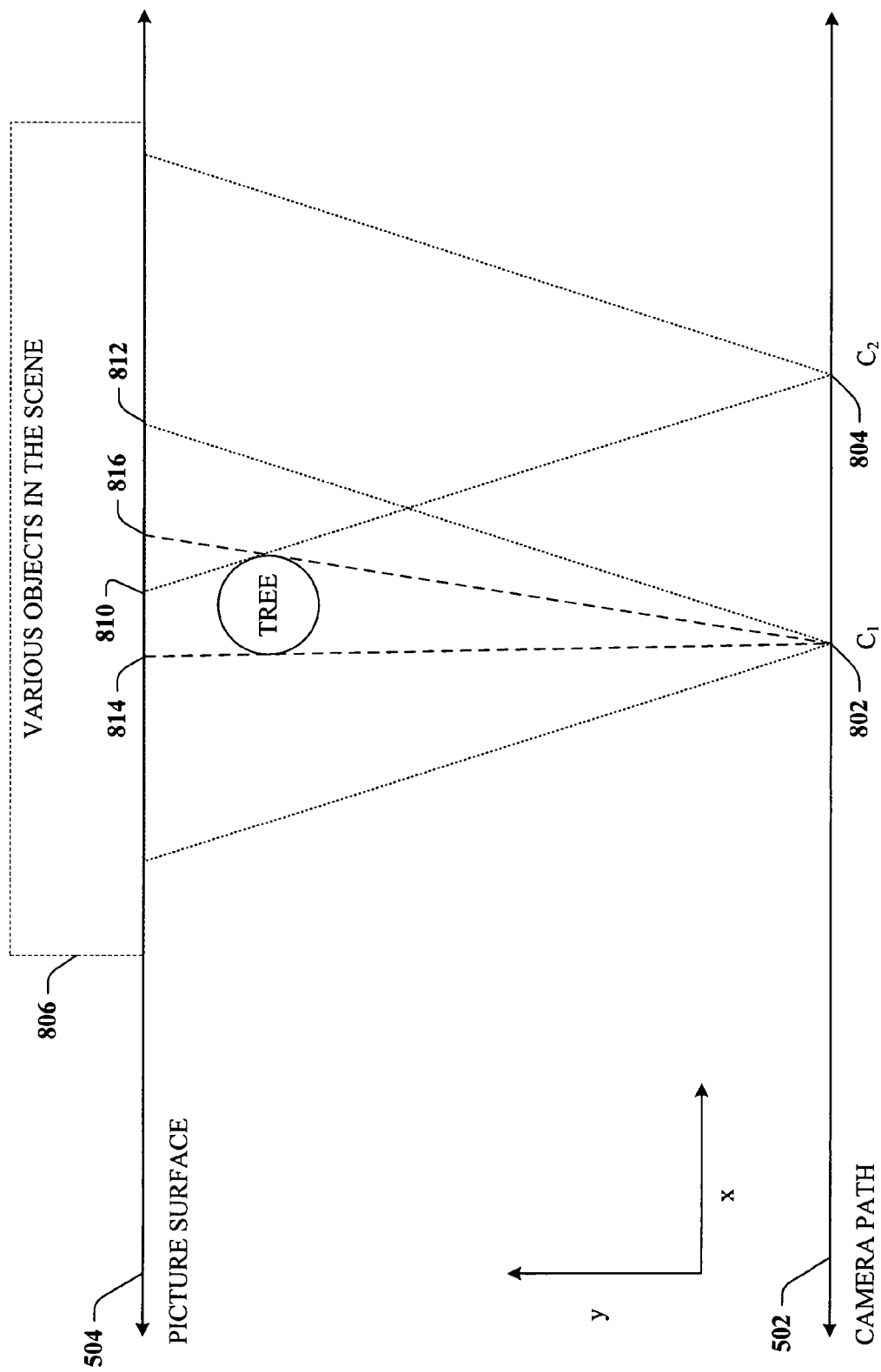
FIG. 8 illustrates an exemplary slice of an orthogonal view of a 3-dimensional model with a depth discontinuity between feature points occludes portions of the camera views.

Turning now to FIG. 8, there is depicted an environment 800 that generally the camera path 502 and the picture 504, as well as camera locations 802 and 804 and other objects in the scene 806, some of which can lie on the dominant depth while other objects 806 may not lie on the dominant depth. The images overlap in the area between 810 and 812 and there is a tree in the foreground that can create a depth discontinuity and obstructs the view of the objects 806 between 814 and 816. Since an observer from the camera location 802 would normally have no expectations about what objects 806 lie at the location 816 (since the neighboring pixels to the left of 816 were occluded by the tree), depth discontinuities create natural seams to make a transition, which in this case would be from the image taken at 802 to the image taken at 804.

It is to be appreciated that the data cost in this case would not favor a transition at 816 because it is to the left of the midpoint (not shown) between the two images, implying it would still favor pixel from the image taken at camera location 802. Such a consideration would be especially relevant if the objects 806, when view at, and to the right of, location 816 intersected with the picture surface 504 (e.g., were at the dominant depth). In that case, the two images would typically agree nicely adding little or nothing to a seam cost at 816. Additionally or alternatively, there could be strong edge (not shown) slightly to the right of 816, which could produce a more optimized output for the objective function. In contrast, if the objects 806 do not intersect the picture surface 504 at a point on the line from 802 that passes through 816, but somewhere beyond the dominant depth, both the seam cost and the data cost will generally yield less favorable results to make a transition anywhere but 816. In that case the seam cost will tend to be higher because it is off the dominant depth and the data cost will tend to be higher because as the line from 802 that passes through 816 extends beyond the picture surface 504, the x-axis coordinate of the location where an object in the background is intersected will increase as well, nearing the midpoint (not shown) or even passing it. It is also to be appreciated that the area between 810 and 816, seen from the camera location 804 will typically not be present in the optimized image to reduce stretching type distortions.

Figure 9:
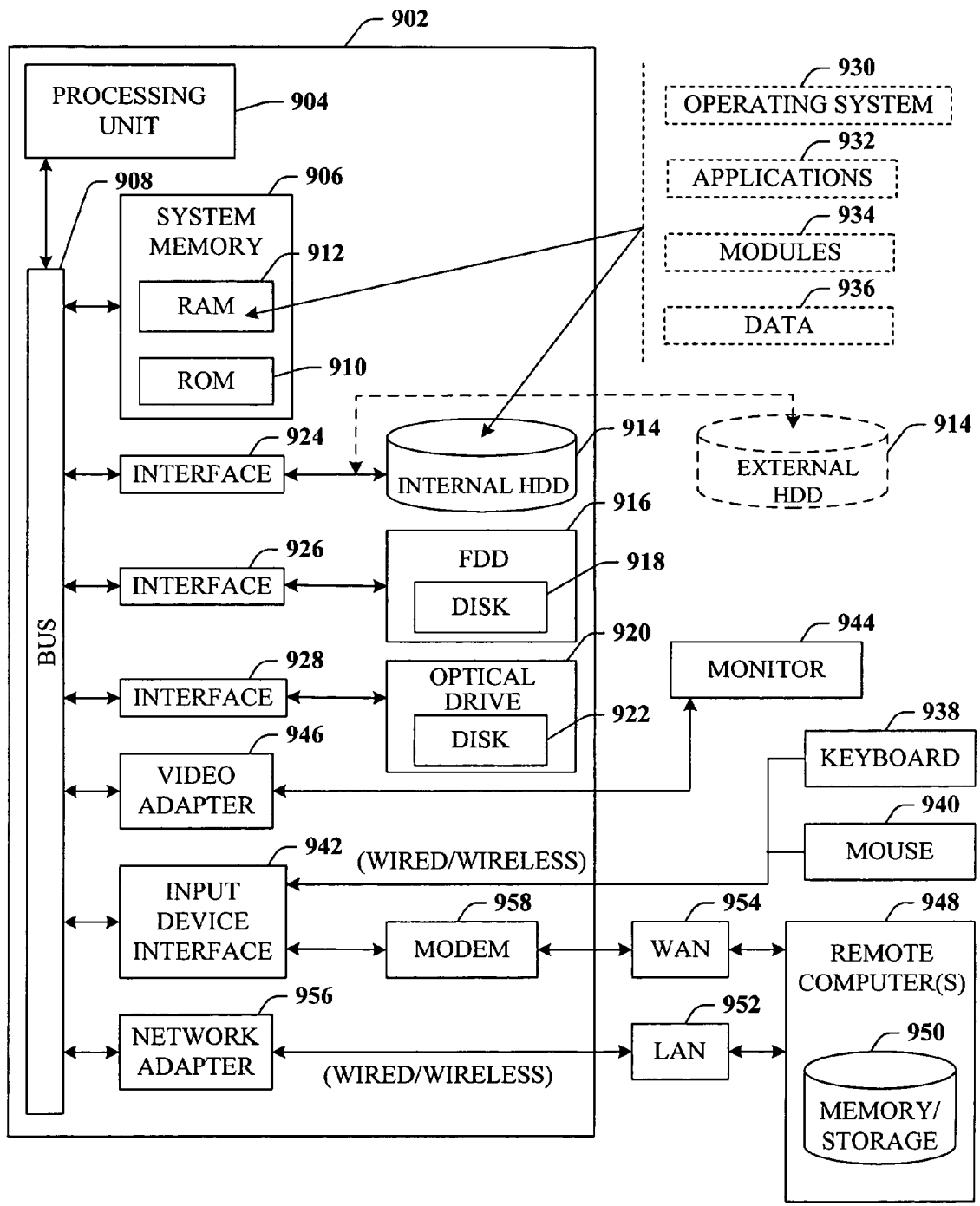
FIG. 9 illustrates a block diagram of a computer operable to execute the disclosed architecture.

Referring now to FIG. 9, there is illustrated a block diagram of an exemplary computer system operable to execute the disclosed architecture. In order to provide additional context for various aspects of the claimed subject matter, FIG. 9 and the following discussion are intended to provide a brief, general description of a suitable computing environment 900 in which the various aspects of the claimed subject matter can be implemented. For example, the computer implemented system that facilitates optimized, multi-perspective digital image generation can be implemented via the system 900, wherein several input images reside on a disk drive or the system 900 is interfaced to, for example, a camera. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the claimed subject matter includes a computer 902, the computer 902 including a processing unit 904, a system memory 906 and a system bus 908. The system bus 908 couples to system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 994 interface technologies. Other external drive connection technologies are within contemplation of the claimed subject matter.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the claimed subject matter can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 994 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
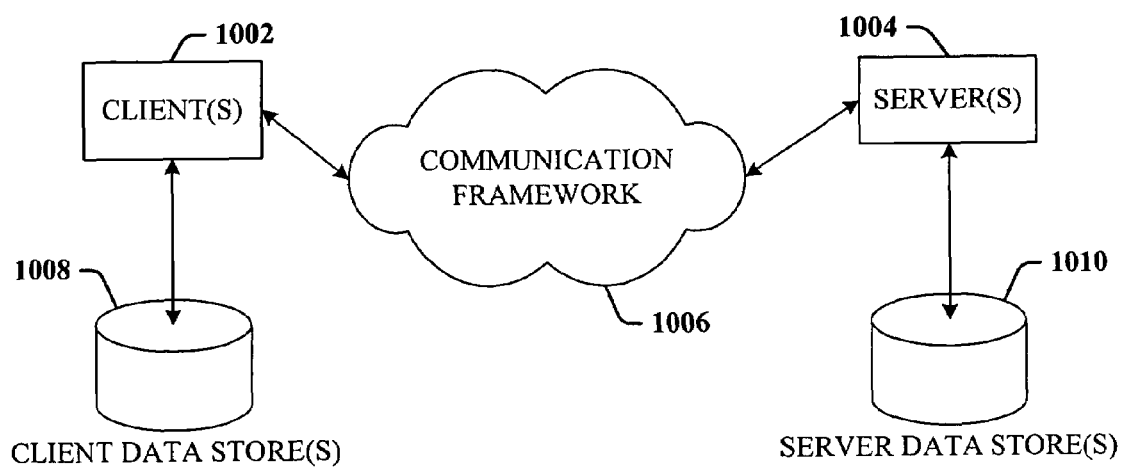
FIG. 10 illustrates a schematic block diagram of an exemplary computing environment.

Referring now to FIG. 10, there is illustrated a schematic block diagram of an exemplary computer compilation system operable to execute the disclosed architecture. The system 1000 includes one or more client(s) 1002. The client(s) 1002 can be hardware such as a digital camera with computer interface support and/or software (e.g., threads, processes, computing devices). The client(s) 1002 can house cookie(s) and/or associated contextual information by employing the claimed subject matter, for example.

The system 1000 also includes one or more server(s) 1004. The server(s) 1004 can also be hardware and/or software (e.g., threads, processes, computing devices). The servers 1004 can house threads to perform transformations by employing the claimed subject matter, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates optimized, multi-perspective digital image generation, comprising:
    an interface that receives a plurality of images that correspond to a plurality of camera locations along a camera path, each respective image depicts a portion of a 3-dimensional scene from the point of view of one of the plurality of camera locations; and
    an image generation component that generates an optimized image, the image generation component comprising:
        a surface definition component that determines a dominant depth for the scene and generates a 2-dimensional picture surface at the dominant depth;
        a projection component that projects each pixel of an image from the plurality of images onto the picture surface and identifies overlapping pixels; and
        an optimization component that selects a best pixel to be projected from among the overlapping pixels based on an objective function.

2. The system of claim 1, the objective function is based upon a seam cost, the seam cost is a function of consistency of a pixel with adjacent pixels, a strong edge in the picture surface, and the dominant depth.

3. The system of claim 2, the optimization component minimizes the objective function, the objective function is the sum of the seam cost and a data cost, the data cost is proportional to the distance of a pixel from the center of an image that includes the pixel.

4. The system of claim 2, the seam cost is based upon a depth discontinuity between objects in the scene.

5. The system of claim 2, the seam cost is based upon item recognition of items in the scene.

6. The system of claim 1, the dominant depth is based upon at least one dominant feature of the scene.

7. The system of claim 1, the dominant depth is based upon the alignment between images projected onto the picture surface.

8. The system of claim 1, the plurality of camera locations are each separated by a distance of at least 6 inches.

9. The system of claim 1, at least one of the plurality of images is a multi-perspective image.

10. A computer implemented methodology that facilitates generating a 2-dimensional picture surface of a scene, comprising:
    receiving a plurality of images relating to a scene, each image corresponding to a different camera position on a camera path;
    computing a plurality of projection matrices, one projection matrix for each camera position corresponding to the plurality of images;
    constructing a 3-dimensional model of the scene;

determining a plurality of feature points for the model based upon dominant objects in the scene;

determining a dominant depth for the model based at least in part upon the plurality of feature points; and defining a 2-dimensional picture surface at the dominant depth of the model.

11. The method of claim 10, the dominant depth is determined based upon a most dominant object in the scene.

12. The method of claim 10, the dominant depth is determined based upon an efficient alignment between a plurality of feature points within the model.

13. The method of claim 10, further comprising spacing each camera position on the camera path by a distance of at least 6 inches.

14. The method of claim 10, the plurality of images received comprises a multi-perspective image.

15. The method of claim 10, the scene is a 3-dimensional scene.

16. A computer implemented methodology that facilitates optimizing a multi-perspective picture surface, comprising:

receiving a plurality of images relating to a scene, each image corresponding to a different camera position on a camera path;

projecting each pixel of an image from each of the plurality of images onto a multi-perspective picture surface;

identifying overlapping pixels;

selecting a best pixel between the overlapping pixels based upon an objective function, the objective function employing at least a seam cost; and determining the seam cost based upon uniformity between neighboring pixels, an edge feature in the picture surface, and a dominant depth of the scene.

17. The method of claim 16, the best pixel is selected by minimizing the objective function, which is determined by summing the seam cost and a data cost, the data cost is proportional to the distance of a pixel from the center of an image comprising the pixel.

18. The method of claim 16, the determining a seam cost is further based upon a depth discontinuity between objects in the scene.

19. The method of claim 16, the determining a seam cost is further based upon item recognition of items in the scene.

20. The method of claim 16, the picture surface is a 2-dimensional picture surface residing at the dominant depth of the scene.

* * * * *